Feb. 15, 1927.
G. F. HONOLD ET AL
1,617,907
ROLLER BEARING
Filed March 3, 1924
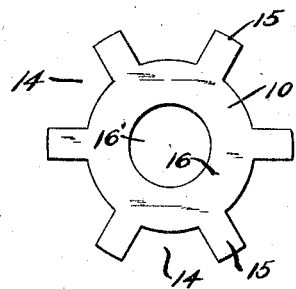
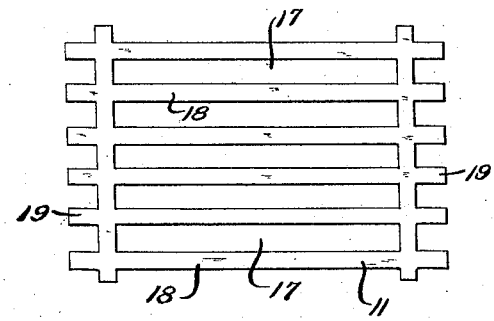
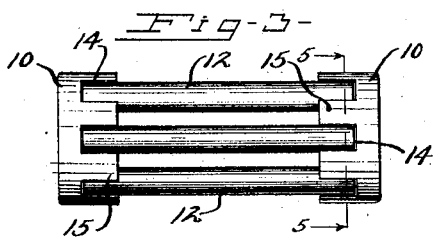
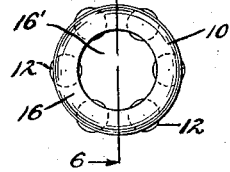
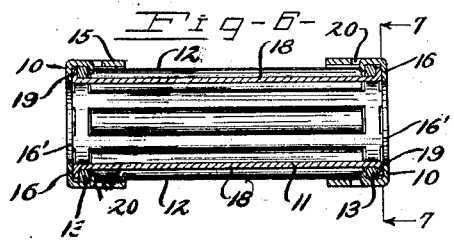
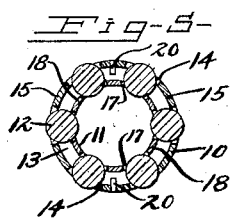
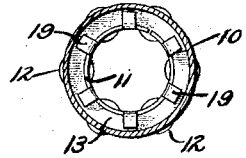
INVENTOR,
Gottlob F. Honold and
Fred Leicht.
BY
Morsell, Kenny & Morsell
ATTORNEYS.

Patented Feb. 15, 1927.

1,617,907

UNITED STATES PATENT OFFICE.

GOTTLOB F. HONOLD AND FRED LEICHT, OF SHEBOYGAN, WISCONSIN, ASSIGNORS TO HONOLD MANUFACTURING COMPANY, OF SHEBOYGAN, WISCONSIN, A CORPORATION OF WISCONSIN.

ROLLER BEARING.

Application filed March 3, 1924. Serial No. 696,505.

This invention relates to improvements in roller bearings, more particularly adapted for vehicles for children's use.

It is one of the objects of the present invention to provide a three part roller bearing cage which forms raceways for a plurality of antifriction rollers mounted therein.

A further object of the invention is to provide a three part roller bearing cage in which the three parts are locked together to maintain the rollers in position and to hold end bearings for the rollers.

A further object of the invention is to provide a roller bearing cage which may be formed of sheet metal.

A further object of the invention is to provide a roller bearing which will maintain the rollers in parallel relation to each other and also hold the rollers in position when the cage is removed from its place of use.

A further object of the invention is to provide a roller bearing having end portions adapted to eliminate end wear from the portions connecting the three parts of the cage together.

A further object of the invention is to provide a roller bearing which is of simple construction, is strong and durable, and is well adapted for the purpose described.

In the accompanying drawing in which the same reference characters indicate the same parts in all of the views:

Fig. 1 is a side view of one of the outer end cage members before it is bent into circular form;

Fig. 2 is a similar view of the inner cage member;

Fig. 3 is a side view of the complete bearing in assembled position;

Fig. 4 is an end view thereof;

Fig. 5 is a transverse sectional view taken on line 5—5 of Fig. 3;

Fig. 6 is a longitudinal sectional view taken on line 6—6 of Fig. 4; and

Fig. 7 is a sectional detail view taken on line 7—7 of Fig. 6.

Referring to the drawing, the numeral 10 indicates the outer members of the cage, 11 the inner member, 12 the anti-friction rollers and 13 the end bearing rings. One of the outer members is shown in Fig. 1 in a flat form before being bent into circular or cup shape and is cut from sheet metal to provide roller spaces 14, longitudinally extending roller retaining parts 15 and end portions 16 having end openings 16′. The inner member 11 of the cage shown flat before being bent into circular form, is also cut from sheet metal and is provided with roller spaces 17, longitudinally extending roller retaining parts 18 and end connecting tongue portions 19 which are adapted to be bent radially outwardly against the outer sides of the bearing rings 13 to maintain the outer and inner members 10 and 11 and the rings 13 in spaced relation, as more clearly shown in Figs. 6 and 7. The tongue portions 19 are interposed between the rings 13 and the cap ends 16, and tongue portions 20 cut from the outer members are forced downwardly on the inner sides of the rings 13 to lock said rings in position. As thus constructed, the outer and inner members and the rings are maintained in spaced relation and the members are prevented from separating. Before the outer and inner members are connected together, the anti-friction rollers 12 are placed in the roller spaces in the inner member and the end bearing rings 13 are placed around the inner member adjacent the ends of the rollers and the tongues 19 of the inner member are then bent radially outwardly to hold the ring in position. The ends or cap members are then placed in position and the tongues 20 are then forced inwardly to lock the parts together. In assembling the parts, the tongues on one end of the inner member may be bent and after the rings are in position, tongues at the opposite end of the said inner member are bent and the end members then placed in position.

As thus constructed, the rollers will slightly project laterally through the spaces 14 and 17 of the outer and inner members, but as said spaces are of less width than the diameter of the rollers, the rollers are maintained in spaced relation in position although free to easily revolve around the shaft on which it is mounted.

From the foregoing description, it will be seen that the roller bearing cage is of very simple construction and is well adapted for the purpose described.

What we claim as our invention is:

1. A roller bearing, comprising outer end members having outer elongated openings, an inner member connected to the outer members in spaced relation and having outer elongated openings in register with the openings of the outer members, rollers positioned between the inner and outer members and extending radially through the openings of said members, and bearing means interposed between the roller ends and portions of the inner member.

2. A roller bearing, comprising outer end members having outer elongated openings and cupped end portions, an inner member having radially extending end tongues to hold the members in spaced relation and also having elongated openings in register with the openings of the outer members, rollers positioned between the inner and outer members and extending radially through the openings of said members, and bearing members interposed between the rollers and the tongues.

3. A roller bearing, comprising outer end members having elongated openings and cupped end portions, an inner member having elongated openings in register with the openings of the outer member and also having radially extending end tongues to hold said members in spaced relation, end bearing rings interposed between the inner and outer members, and rollers positioned between the inner and outer members and extending through the elongated openings, said outer end members also having means engaging the bearing rings to lock the parts together.

4. A roller bearing, comprising outer tubular members having elongated openings and end portions, an inner tubular member having elongated openings in register with the openings of the outer member and also having radially extending end tongues to hold the members in spaced relation, rollers positioned between the inner and outer members and extending through the elongated openings, and bearing rings interposed between the inner and outer members and between the roller ends and the radial tongues, said outer members having tongues which extend inwardly against the inner faces of the bearing rings to lock the parts together.

5. A roller bearing, comprising outer tubular members formed of sheet metal and having elongated openings and end portions, an inner tubular member formed of sheet metal and having elongated openings in radial alinement with the openings of the outer member and also having radially extending end tongues to hold the members in spaced relation, rollers positioned between the two members and extending through the elongated openings, said openings being of less width than the diameter of the rollers to maintain said rollers in position, and bearing rings positioned between the two members and interposed between the roller ends of the radial tongues, said outer members having tongues which extend inwardly against the inner faces of the bearing rings to lock the parts together.

In testimony whereof, we affix our signatures.

GOTTLOB F. HONOLD.
FRED LEICHT.